United States Patent

Muller

(10) Patent No.: US 7,507,263 B2
(45) Date of Patent: Mar. 24, 2009

(54) FIBRE-REACTIVE ANTHRAQUINONE DYES, PROCESS FOR THEIR PREPARATION AND THE USE THEREOF

(75) Inventor: Bernhard Muller, Efringen-Kirchen (DE)

(73) Assignee: Huntsman International LLC, The Woodlands, TX (US)

( * ) Notice: Subject to any disclaimer, the term of this patent is extended or adjusted under 35 U.S.C. 154(b) by 0 days.

(21) Appl. No.: 11/711,350

(22) Filed: Feb. 27, 2007

(65) Prior Publication Data

US 2007/0151049 A1 Jul. 5, 2007

Related U.S. Application Data

(63) Continuation of application No. 08/801,327, filed on Feb. 18, 1997, now abandoned, which is a continuation of application No. 08/541,009, filed on Oct. 11, 1995, now abandoned.

(30) Foreign Application Priority Data

Oct. 11, 1995 (CH) ..................... 3092/94

(51) Int. Cl.
*C09B 1/24* (2006.01)
(52) U.S. Cl. ............. 8/677; 8/676; 8/680; 8/688
(58) Field of Classification Search ......... 8/676, 8/677, 680, 688; 544/187
See application file for complete search history.

(56) References Cited

U.S. PATENT DOCUMENTS

| 3,558,621 A | 1/1971 | Bien et al. |
| 4,442,288 A | 4/1984 | Meininger et al. |
| 4,631,341 A | 12/1986 | Kayane et al. |
| 5,410,041 A | 4/1995 | Muller |
| 5,420,256 A | 5/1995 | Eizenhofer et al. |

FOREIGN PATENT DOCUMENTS

| EP | 0031099 | 7/1981 |
| EP | 0074928 | 3/1983 |
| EP | 0133270 | 2/1985 |
| GB | 2034731 | * 6/1980 |

OTHER PUBLICATIONS

B. Bosnich and J.M. Harrowfield, Journal of the American Chemical Society, 94, p. 3425, 1971.
R.O. Hutchins and B.E. Maryanoff, J. Organic Chemistry, 37, p. 1829, 1972.

* cited by examiner

*Primary Examiner*—Lorna M Douyon
*Assistant Examiner*—Amina Khan

(57) ABSTRACT

Anthraquinone dyes of formula

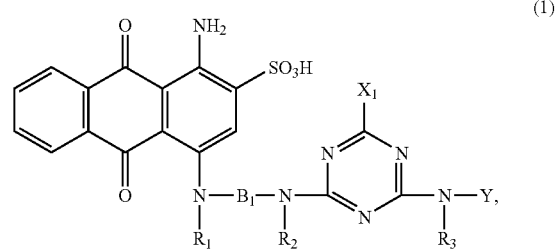

(1)

wherein
$R_1$, $R_2$ and $R_3$ are each independently of one another hydrogen or unsubstituted or substituted $C_1$-$C_{12}$alkyl,
$X_1$ is chloro or fluoro,
$B_1$ is methylene-phenylene-methylene which is unsubstituted or substituted in the phenylene ring by $C_1$-$C_4$alkyl, $C_1$-$C_4$alkoxy, $C_2$-$C_4$alkanoylamino, halogen, carboxy or sulfo, or is a radical of formula —$(CH_2)_3$—$CH(CH_3)$—$CH_2$—, —$CH_2$—$CH_2$—$CH(C_2H_5)$—, —$CH_2$—$CH(OH)$—$CH_2$— or —$CH_2$—$C(CH_3)_2$—$CH_2$—,
Y is hydrogen, unsubstituted or substituted $C_1$-$C_{12}$alkyl, or phenyl or naphthyl, each unsubstituted or substituted by $C_1$-$C_4$alkyl, $C_1$-$C_4$alkoxy, $C_2$-$C_4$alkanoylamino, halogen, carboxy, sulfo or a radical of formula —$SO_2$—Z, wherein Z is a group of formula —$CH$=$CH_2$ or —$CH_2$—$CH_2$—$U_1$, and $U_1$ is a leaving group,
are particularly suitable for dyeing or printing cellulosic fiber materials or natural or synthetic polyamide fiber materials in high tinctorial yield and give dyeings and prints of good fastness properties.

2 Claims, No Drawings

FIBRE-REACTIVE ANTHRAQUINONE DYES, PROCESS FOR THEIR PREPARATION AND THE USE THEREOF

CROSS REFERENCE TO RELATED APPLICATIONS

This application is a continuation of U.S. patent application Ser. No. 08/801,327, filed Feb. 18, 1997, now abandoned, which is a continuation of U.S. patent application Ser. No. 08/541,009, filed Oct. 11, 1995, now abandoned, and which claims priority to Swiss Pat. App. No. 3092/94-4, filed Oct. 14, 1994. The noted applications are incorporated herein by reference.

The present invention relates to novel fibre-reactive anthraquinone dyes, to a process for their preparation and to the use thereof for dyeing or printing fibre materials.

The practice of dyeing with reactive dyes in recent years has led to more exacting demands being made of the quality of the dyeings obtained and to the efficiency of the dyeing process. Consequently there is a continuing need to provide novel reactive dyes that have enhanced properties, especially with respect to application.

At the present time it is required of reactive dyes that they shall have sufficient substantivity for the substrate to be dyed and at the same time have the property that unfixed dye is easily washed off. They are further required to afford a good tinctorial yield and have high reactivity to give in particular dyeings of good fixation. The known dyes do not meet these requirements in all respects.

It is therefore the object of this invention to provide novel, improved reactive dyes for dyeing and printing fibre materials that have the qualities referred to above to a high degree. The novel dyes shall in particular be distinguished by high fixation yields and high fibre-dye bonding stability, and it shall furthermore be possible to wash-off unfixed dye on the fibre with ease. The novel dyes shall also produce dyeings with good allround fastness properties, preferably light- and wetfastness properties.

It has been found that the novel reactive dyes defined hereinafter substantially meet these requirements.

Accordingly, the invention relates to anthraquinone dyes of formula

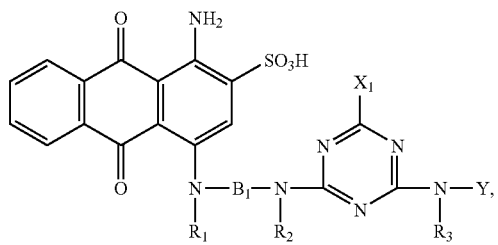

(1)

wherein
$R_1$, $R_2$ and $R_3$ are each independently of one another hydrogen or unsubstituted or substituted $C_1$-$C_{12}$alkyl,
$X_1$ is chloro or fluoro,
$B_1$ is methylene-phenylene-methylene which is unsubstituted or substituted in the phenylene ring by $C_1$-$C_4$alkyl, $C_1$-$C_4$alkoxy, $C_2$-$C_4$alkanoylamino, halogen, carboxy or sulfo, or is a radical of formula —(CH$_2$)$_3$—CH(CH$_3$)—CH$_2$—, —CH$_2$—CH$_2$—CH(C$_2$H$_5$)—, —CH$_2$—CH(OH)—CH$_2$— or —CH$_2$—C(CH$_3$)$_2$—CH$_2$—, Y is hydrogen, unsubstituted or substituted $C_1$-$C_{12}$alkyl, or phenyl or naphthyl, each unsubstituted or substituted by $C_1$-$C_4$alkyl, $C_1$-$C_4$alkoxy, $C_2$-$C_4$alkanoylamino, halogen, carboxy, sulfo or a radical of formula —SO$_2$—Z, wherein
Z is a group of formula —CH=CH$_2$ or —CH$_2$—CH$_2$—U$_1$, and U$_1$ is a leaving group.

Suitable $C_1$-$C_{12}$alkyl radicals $R_1$, $R_2$, $R_3$ and Y are preferably $C_1$-$C_{10}$alkyl radicals, more particularly $C_1$-$C_8$alkyl radicals. These alkyl radicals, with the exception of methyl, may be interrupted by oxygen, preferably by 1, 2 or 3 members —O—, more particularly by 1 or 2 members —O—. These alkyl radicals may be also be unsubstituted or substituted, possible substituents being hydroxyl, sulfo or sulfato, preferably hydroxyl or sulfo, most preferably hydroxyl. The substituent Y defined as alkyl may further be substituted by the radical of an anthraquinone dye, typically by a radical of 1,4-diaminoanthraquinone-2-sulfonic acid, which is bonded through the amino group in 4-position.

The radical $B_1$ in the significance of methylene-phenylene-methylene may be unsubstituted or substituted in the phenylene ring by $C_1$-$C_4$alkyl, typically methyl, ethyl, propyl, isopropyl, butyl, sec-butyl, tert-butyl or isobutyl, preferably methyl, or by $C_1$-$C_4$alkoxy, typically methoxy, ethoxy, propoxy, isopropoxy, butoxy or isobutoxy, preferably methoxy, by $C_2$-$C_4$alkanoylamino such as acetylamino or propionylamino, by halogen such as fluoro, chloro or bromo, preferably chloro, or by sulfo or carboxy. The methylene-phenylene-methylene radical is preferably unsubstituted or substituted in the phenylene ring by $C_1$-$C_4$alkyl, $C_1$-$C_4$alkoxy, halogen or sulfo. The corresponding unsubstituted radicals are of particular interest.

The phenyl and naphthyl radicals represented by Y may be unsubstituted or substituted by $C_1$-$C_4$alkyl, typically methyl, ethyl, propyl, isopropyl, butyl, sec-butyl, tert-butyl or isobutyl, preferably methyl, or by $C_1$-$C_4$alkoxy, typically methoxy, ethoxy, propoxy, isopropoxy, butoxy or isobutoxy, preferably methoxy, or by $C_2$-$C_4$alkanoylamino such as acetylamino or propionylamino, by halogen such as fluoro, chloro or bromo, preferably chloro, or by sulfo, carboxy or by a radical of formula —SO$_2$—Z.

Suitable leaving groups $U_1$ are typically —Cl, —Br, —F, —OSO$_3$H, —SSO$_3$H, —OCO—CH$_3$, —OPO$_3$H$_2$, —OCO—CCl$_3$, —OCO—CHCl$_2$, —OCO—CH$_2$Cl, —OSO$_2$—C$_1$-C$_4$alkyl, —OSO$_2$—N(C$_1$-C$_4$alkyl)$_2$ or —OCO—C$_6$H$_5$.

Preferably $U_1$ is a group of formula —Cl, —OSO$_3$H, —SSO$_3$H, —OCO—CH$_3$, —OCO—C$_6$H$_5$ or —OPO$_3$H$_2$, preferably —Cl or —OSO$_3$H, preferably —OSO$_3$H.

$R_1$ and $R_2$ are preferably hydrogen or $C_1$-$C_4$alkyl, more particularly hydrogen.

$R_3$ is preferably hydrogen or $C_1$-$C_8$alkyl which is unsubstituted or substituted by hydroxyl, sulfo or sulfato and, with the exception of methyl, may be interrupted by oxygen, and is more particularly hydrogen or unsubstituted or hydroxyl-substituted $C_1$-$C_4$alkyl. The most preferred meaning is hydrogen.

$R_1$ and $R_2$ are more particularly hydrogen or $C_1$-$C_4$alkyl, most preferably hydrogen, and $R_3$ is hydrogen or $C_1$-$C_8$alkyl which is unsubstituted or substituted by hydroxyl, sulfo or sulfato and, with the exception of methyl, may be interrupted by oxygen. More particularly $R_3$ is hydrogen or unsubstituted or hydroxyl-substituted $C_1$-$C_4$alkyl, and is most preferably hydrogen.

$R_1$, $R_2$ and $R_3$ are most preferably hydrogen.

$B_1$ in the significance of methylene-phenylene-methylene is preferably a radical of formula

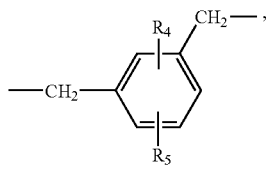
(2)

wherein $R_4$ and $R_5$ are each independently of the other hydrogen, $C_1$-$C_4$alkyl, $C_1$-$C_4$alkoxy, $C_2$-$C_4$alkanoylamino, halogen, carboxy or sulfo, preferably hydrogen, $C_1$-$C_4$alkyl, $C_1$-$C_4$alkoxy, halogen or sulfo and, most preferably, hydrogen.

Suitable alkylene linking groups $B_1$ mentioned above are preferably those of formula —$(CH_2)_3$—$CH(CH_3)$—$CH_2$—, —$CH_2$—$CH(OH)$—$CH_2$— or —$CH_2$—$C(CH_3)_2$—$CH_2$—, more particularly those of formula —$(CH_2)_3$—$CH(CH_3)$—$CH_2$— or —$CH_2$—$C(CH_3)_2$—$CH_2$—. The radical of formula —$CH_2$—$C(CH_3)_2$—$CH_2$— is particularly preferred.

Preferably $B_1$ is a methylene-phenylene-methylene radical which is unsubstituted or substituted as indicated above or a radical of formula —$(CH_2)_3$—$CH(CH_3)$—$CH_2$— or, preferably, —$CH_2$—$C(CH_3)_2$—$CH_2$—, said methylene-phenylene-methylene radical having the meanings and preferred meanings cited above.

More particularly, $B_1$ is methylene-phenylene-methylene or a radical of formula —$CH_2$—$C(CH_3)_2$—$CH_2$—.

Most preferably, $B_1$ is a radical of formula —$CH_2$—$C(CH_3)_2$—$CH_2$—.

Y is preferably hydrogen; $C_1$-$C_{12}$alkyl which is unsubstituted or substituted hydroxyl, sulfo or sulfato and, with the exception of methyl, interrupted by oxygen; or phenyl or naphthyl, each unsubstituted or substituted by $C_1$-$C_4$alkyl, $C_1$-$C_4$alkoxy, $C_2$-$C_4$alkanoylamino, halogen, carboxy, sulfo or a radical of formula —$SO_2$—Z, wherein Z is a group of formula —$CH$=$CH_2$ or —$CH_2$—$CH_2$—$U_1$, and $U_1$ is preferably chloro or sulfato; or an anthraquinone radical of formula

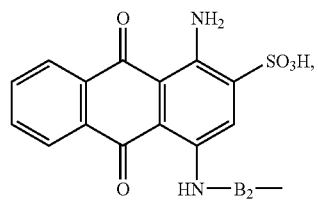
(3)

wherein $B_2$ is $C_2$-$C_{12}$alkylene which is unsubstituted or substituted by hydroxyl, sulfo or sulfato, and which may be interrupted by oxygen, or methylene-phenylene-methylene which is unsubstituted or substituted in the phenylene ring by $C_1$-$C_4$alkyl, $C_1$-$C_4$alkoxy, $C_2$-$C_4$alkanoylamino, halogen, carboxy or sulfo.

The radicals $B_2$ preferably have the meanings and preferred meanings cited above for $B_1$.

Particularly preferred substituents Y are the above-mentioned phenyl and naphthyl radicals.

More particularly, Y is phenyl or naphthyl which are each unsubstituted or substituted by $C_1$-$C_4$alkyl, $C_1$-$C_4$alkoxy, halogen, sulfo or a radical of formula —$SO_2$—Z, wherein Z is preferably a group of formula —$CH$=$CH_2$ or —$CH_2$—$CH_2$—$U_1$, and $U_1$ is chloro or sulfato.

Most preferably, Y is sulfo-substituted naphthyl or, more particularly, phenyl which is substituted by $C_1$-$C_4$alkyl, $C_1$-$C_4$alkoxy, halogen, sulfo or a radical of formula —$SO_2$—Z, preferably by sulfo. Z is here preferably a group of formula —$CH$=$CH_2$ or —$CH_2$—$CH_2$—$U_1$, and $U_1$ is chloro or sulfato.

Preferred anthraquinone dyes of formula (1) are those of formulae

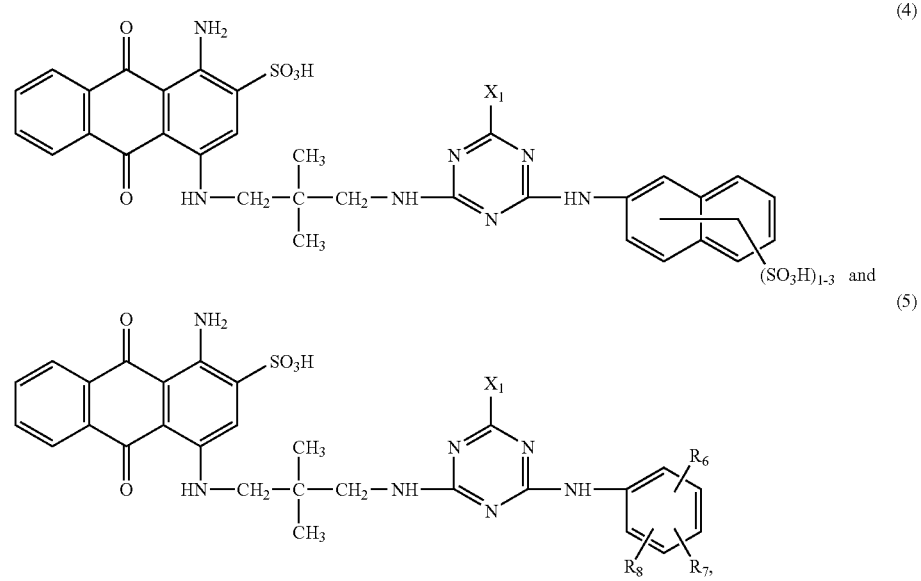

wherein $R_6$, $R_7$ and $R_8$ are each independently of one another hydrogen, $C_1$-$C_4$alkyl, $C_1$-$C_4$alkoxy, halogen, sulfo or a radical of formula —$SO_2$—Z, wherein Z has the meanings and preferred meanings cited above. Preferably Z is a group of formula —CH=$CH_2$ or —$CH_2$—$CH_2$—$U_1$, wherein $U_1$ is chloro or sulfato.

A further group of preferred anthraquinone dyes of formula (1) comprises the dyes of formulae

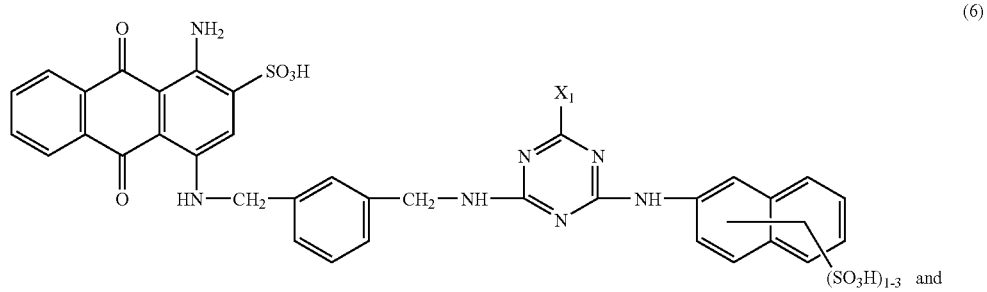

(6)

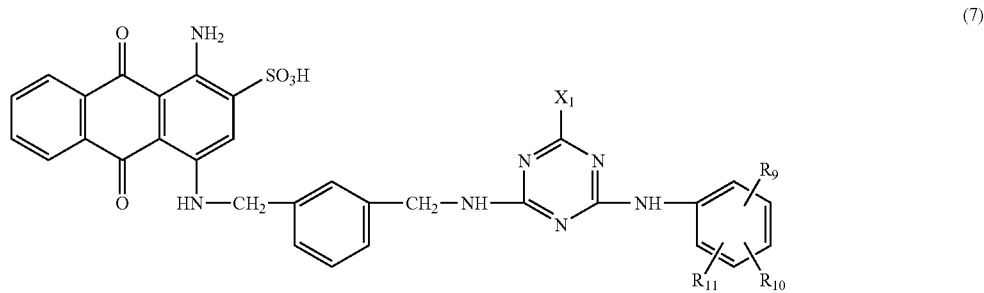

(7)

wherein $R_9$, $R_{10}$ and $R_{11}$ are each independently of one another hydrogen, $C_1$-$C_4$alkyl, $C_1$-$C_4$alkoxy, halogen, sulfo or a radical of formula —$SO_2$—Z, wherein Z has the meanings and preferred meanings cited above. Preferably Z is a group of formula —CH=$CH_2$ or —$CH_2$—$CH_2$—$U_1$, wherein $U_1$ is chloro or sulfato.

$R_6$, $R_7$, $R_8$, $R_9$, $R_{10}$ and $R_{11}$ are preferably each independently of one another hydrogen or sulfo. Most preferably, $R_6$, $R_7$, $R_9$ and $R_{10}$ are sulfo and $R_8$ and $R_{11}$ are hydrogen.

The dyes of formulae (5) and (7) are of particular interest, especially the dye of formula (5), wherein $R_6$, $R_7$, $R_8$, $R_9$, $R_{10}$ and $R_{11}$ have the meanings and preferred meanings cited above.

The invention further relates to a process for the preparation of anthraquinone dyes of formula (1), which comprises condensing an anthraquinone dye of formula

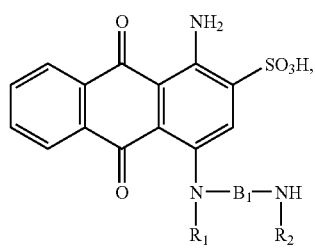

(8)

with a compound of formula

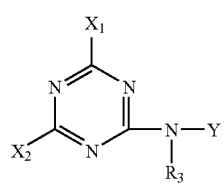

(9)

and subsequently carrying out an optional conversion reaction, in which formulae $X_2$ is chloro or fluoro and $R_1$, $R_2$, $R_3$, $X_1$, $B_1$ and Y have the meanings and preferred meanings given above.

The conversion reaction carried out after the synthesis may be an elimination reaction. For example, the anthraquinone dyes of formula (1) which contain sulfatoethylsulfonyl radicals may be treated with a base, conveniently sodium hydroxide, such that the sulfatoethylsulfonyl radicals are converted into vinylsulfonyl radicals.

In principle, the anthraquinone dyes of formula (1) may be prepared by starting from precursors or intermediates of dyes that contain fibre-reactive radicals, or introducing said fibre-reactive radicals into intermediates of dye character suitable for this purpose.

The compounds of formulae (8) and (9) are known or can be obtained in analogy to known processes.

The individual condensation reactions will usually be carried out in per se known manner in aqueous solution and in the temperature range from 0 to 50° C., preferably from 0 to 10° C., and in the pH range from typically 4 to 10.

The novel dyes of formula (1) are obtained either in the form of the free acid or, preferably, of salts thereof. Suitable salts are typically the alkali metal salts, alkaline earth metal salts or ammonium salts or the salts of an organic amine. Illustrative examples are the sodium, lithium, potassium or ammonium salts or the salt of mono-, di- or triethanolamine.

The novel dyes are suitable for dyeing and printing a wide range of materials such as hydroxyl-group containing or nitrogen-containing fibre materials. Such materials are typically silk, leather, wool, polyamides and polyurethanes, and preferably cellulosic fibre materials of all kinds. Such cellulosic materials typically include the natural cellulose fibres such as cotton, linen and hemp, as well as cellulose and regenerated cellulose. The novel dyes are also suitable for dyeing or printing hydroxyl-group containing fibres which are components of blended fabrics, suitably cotton/polyester or cotton/polyamide blends. The novel dyes are particularly suitable for dyeing or printing cellulosic fibre materials. In addition, they may be used for dyeing or printing natural or synthetic polyamide fibre materials, preferably wool or synthetic polyamide fibre materials.

The dyes of this invention can be applied to the fibre material by a wide variety of means, preferably in the form of aqueous dye solutions and print pastes. They are suitable for dyeing by the exhaust process as well as by the pad process, in which the goods are impregnated with aqueous dye solutions which may or may not contain salt, and the dyes are fixed after treatment with alkali or in the presence of alkali, with or without the application of heat. The novel anthraquinone dyes are also suitable for the cold pad-batch process, in which the dye is applied together with the alkali on the pad and subsequently fixed by storing the fabric for several hours at room temperature. After fixation, the dyeings or prints are washed thoroughly with cold and hot water, with or without the addition of an agent that acts as a dispersant and promotes the diffusion of unfixed dye.

The dyes of this invention are distinguished by high reactivity, good fixation and very good build-up. They can therefore be used by the exhaust dyeing process at low dyeing temperatures, and require only short steaming times in the pad-steam process. Fixation is high and unfixed dye can be easily washed off, the difference between degree of exhaustion and degree of fixation being notably small, i.e the soap loss is minimal. The novel dyes are also particularly suitable for printing, especially on cotton, and likewise for printing nitrogen-containing fibres, typically silk, or also fibre blends that contain wool or silk.

The dyeings and prints obtained with the dyes of this invention have superior tinctorial strength and excellent fibre-dye bonding stability in the acid as well as in the alkaline range. They also have good lightfastness and very good wetfastness properties, including fastness to washing, water, seawater, crossdyeing and perspiration, as well as good fastness to pleating, ironing and rubbing.

The invention is illustrated by the following Examples in which parts and percentages, unless otherwise indicated, are by weight. The relationship between parts by weight and parts by volume is the same as that between the kilogram and the litre.

EXAMPLE 1

19 parts of cyanuric chloride are stirred vigorously into 50 parts of water at 0° C., while adding a wetting agent and 5 parts of disodium hydrogenphosphate. A neutral solution of 17 parts of 2-aminobenzenesulfonic acid in 170 parts of water is then added dropwise to this mixture, while keeping the pH constant at 4.5 by the addition of sodium hydroxide solution. When the reaction is complete, a solution of 38 parts of the anthraquinone compound of formula

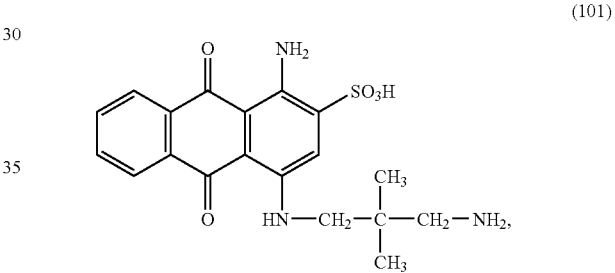

(101)

dissolved with 4 parts of lithium hydroxyde monohydrate in 380 parts of water, are added dropwise such that the pH does not exceed 10. The pH is then kept at 9.5 until completion of the reaction. The dye is salted out by addition of sodium chloride, isolated by filtration, washed with an aqueous solution of sodium chloride and dried, giving a dye of formula

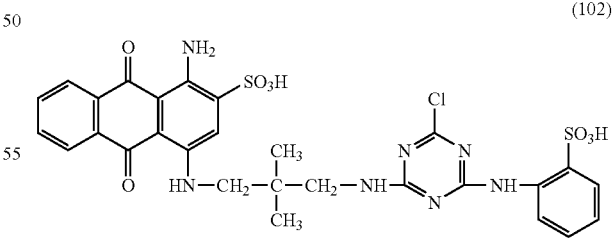

(102)

in the form of the free acid. The dye of formula (102) dyes cotton and wool in a blue shade.

EXAMPLES 2-81

The procedure of Example 1 is repeated, but replacing 17 parts of 2-aminobenzenesulfonic acid with an equimolar amount of an amine of formula H—V$_1$, and 38 parts of an anthraquinone of formula (101) with an equimolar amount of an anthraquinone of formula

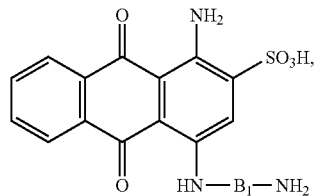
(103)

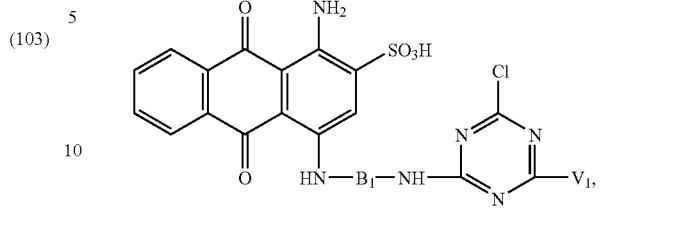
(104)

giving the dyes listed in the following Table 1 of general formula wherein B$_1$ and V$_1$ each have the meanings given in Table 1. The dyes listed in Table 1 dye cotton and wool in blue shades.

TABLE 1

| Ex. | V$_1$ | B$_1$ |
|---|---|---|
| 2 | —HN—C$_6$H$_3$(SO$_3$H)(CH$_3$) (2-SO$_3$H, 4-CH$_3$) | —CH$_2$—C(CH$_3$)$_2$—CH$_2$— |
| 3 | —HN—C$_6$H$_3$(SO$_3$H)(OCH$_3$) (2-SO$_3$H, 4-OCH$_3$) | —CH$_2$—C(CH$_3$)$_2$—CH$_2$— |
| 4 | —NH—C$_6$H$_4$—SO$_3$H (3-SO$_3$H) | —CH$_2$—C(CH$_3$)$_2$—CH$_2$— |
| 5 | —NH—C$_6$H$_3$(SO$_3$H)(CH$_3$) (3-SO$_3$H, 4-CH$_3$) | —CH$_2$—C(CH$_3$)$_2$—CH$_2$— |
| 6 | —NH—C$_6$H$_3$(SO$_3$H)(OCH$_3$) (3-SO$_3$H, 4-OCH$_3$) | —CH$_2$—C(CH$_3$)$_2$—CH$_2$— |
| 7 | —NH—C$_6$H$_3$(SO$_3$H)(SO$_3$H) | —CH$_2$—C(CH$_3$)$_2$—CH$_2$— |
| 8 | —NH—C$_6$H$_2$(SO$_3$H)$_2$(CH$_3$) | —CH$_2$—C(CH$_3$)$_2$—CH$_2$— |
| 9 | —NH—C$_6$H$_2$(SO$_3$H)$_2$(OCH$_3$) | —CH$_2$—C(CH$_3$)$_2$—CH$_2$— |
| 10 | —NH—C$_6$H$_4$—SO$_3$H (4-SO$_3$H) | —CH$_2$—C(CH$_3$)$_2$—CH$_2$— |

TABLE 1-continued

| Ex. | V₁ | B₁ |
|---|---|---|
| 11 | —NH—C₆H₃(SO₃H)₂ (2,5-disulfo-anilino; HO₃S at 2-position, SO₃H at 5-position) | —CH₂—C(CH₃)₂—CH₂— |
| 12 | 2-amino-1-sulfo-naphthalene (—NH at 2-position, SO₃H at 1-position of naphthalene) | —CH₂—C(CH₃)₂—CH₂— |
| 13 | 6-amino-1,5-disulfo-naphthalene (—NH at 6-position; SO₃H at 1 and 5) | —CH₂—C(CH₃)₂—CH₂— |
| 14 | 7-amino-1,5-disulfo-naphthalene (—NH at 7-position; SO₃H at 1 and 5) | —CH₂—C(CH₃)₂—CH₂— |
| 15 | 7-amino-1,3-disulfo-naphthalene (—NH at 7-position; SO₃H at 1 and 3) | —CH₂—C(CH₃)₂—CH₂— |
| 16 | 6-amino-1,3,6-trisulfo naphthalene (—NH at 6; SO₃H at 1, 3 and HO₃S at 7) | —CH₂—C(CH₃)₂—CH₂— |
| 17 | —NH—C₆H₃(SO₃H)—SO₂—CH₂CH₂—OSO₃H (2-sulfo-4-(β-sulfatoethylsulfonyl)anilino) | —CH₂—C(CH₃)₂—CH₂— |
| 18 | —NH—C₆H₃(SO₃H)—SO₂—CH=CH₂ (2-sulfo-4-vinylsulfonyl-anilino) | —CH₂—C(CH₃)₂—CH₂— |

TABLE 1-continued
| Ex. | V₁ | B₁ |
|---|---|---|
| 19 | 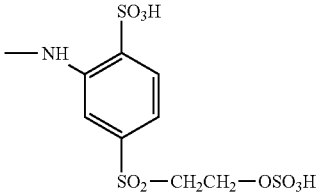 | 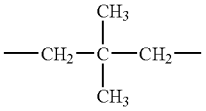 |
| 20 | 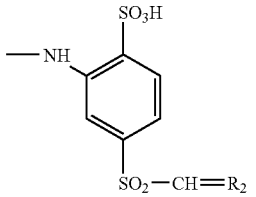 | 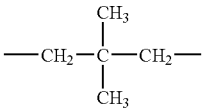 |
| 21 | —NH—CH₂CH₂—SO₃H | 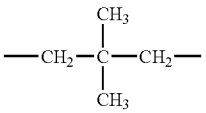 |
| 22 | 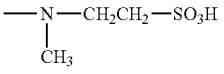 | 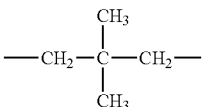 |
| 23 | 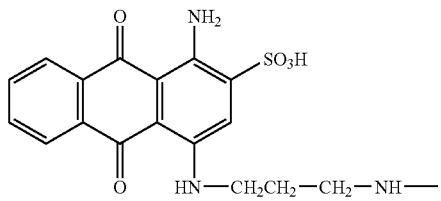 | 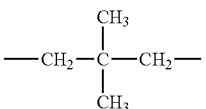 |
| 24 | 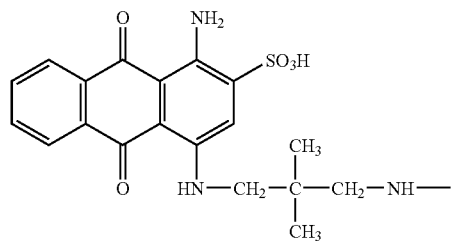 | 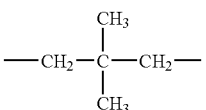 |
| 25 | 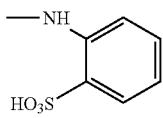 | 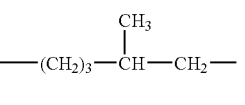 |
| 26 | 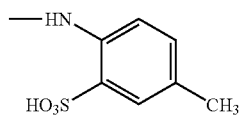 | 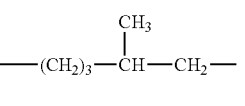 |
| 27 | 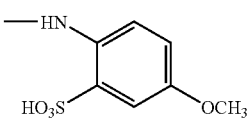 | 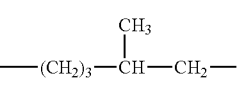 |

TABLE 1-continued

| Ex. | V₁ | B₁ |
|---|---|---|
| 28 | —NH—C₆H₃(SO₃H)- (3-SO₃H) | —(CH₂)₃—CH(CH₃)—CH₂— |
| 29 | —NH—C₆H₂(SO₃H)(CH₃)- (2-SO₃H, 4-CH₃) | —(CH₂)₃—CH(CH₃)—CH₂— |
| 30 | —NH—C₆H₂(SO₃H)(OCH₃)- (2-SO₃H, 3-OCH₃) | —(CH₂)₃—CH(CH₃)—CH₂— |
| 31 | —NH—C₆H₂(SO₃H)₂- (2,5-di-SO₃H) | —(CH₂)₃—CH(CH₃)—CH₂— |
| 32 | —NH—C₆H(SO₃H)₂(CH₃)- | —(CH₂)₃—CH(CH₃)—CH₂— |
| 33 | —NH—C₆H(SO₃H)₂(OCH₃)- | —(CH₂)₃—CH(CH₃)—CH₂— |
| 34 | —NH—C₆H₄—SO₃H (4-SO₃H) | —(CH₂)₃—CH(CH₃)—CH₂— |
| 35 | —NH—C₆H₃(SO₃H)₂- (3,4-di-SO₃H) | —(CH₂)₃—CH(CH₃)—CH₂— |
| 36 | —NH-naphthyl-SO₃H (2-NH, 1-SO₃H) | —(CH₂)₃—CH(CH₃)—CH₂— |
| 37 | —NH-naphthyl-(SO₃H)₂ (2-NH, 1,5-di-SO₃H) | —(CH₂)₃—CH(CH₃)—CH₂— |
| 38 | —NH-naphthyl-(SO₃H)₂ (2-NH, 1,5-di-SO₃H isomer) | —(CH₂)₃—CH(CH₃)—CH₂— |

TABLE 1-continued

| Ex. | V$_1$ | B$_1$ |
|---|---|---|
| 39 | 7-amino-naphthalene-1,3-disulfonic acid (—NH— attached at 7-position; SO$_3$H at 1 and 3) | —(CH$_2$)$_3$—CH(CH$_3$)—CH$_2$— |
| 40 | 6-amino-naphthalene-1,3,7-trisulfonic acid (—NH— at 6; SO$_3$H at 1, 3, 7) | —(CH$_2$)$_3$—CH(CH$_3$)—CH$_2$— |
| 41 | —NH—C$_6$H$_3$(SO$_3$H)(SO$_2$—CH$_2$CH$_2$—OSO$_3$H) | —(CH$_2$)$_3$—CH(CH$_3$)—CH$_2$— |
| 42 | —NH—C$_6$H$_3$(SO$_3$H)(SO$_2$—CH=CH$_2$) | —(CH$_2$)$_3$—CH(CH$_3$)—CH$_2$— |
| 43 | —NH—C$_6$H$_3$(SO$_3$H)(SO$_2$—CH$_2$CH$_2$—OSO$_3$H) (isomer) | —(CH$_2$)$_3$—CH(CH$_3$)—CH$_2$— |
| 44 | —NH—C$_6$H$_3$(SO$_3$H)(SO$_2$—CH=CH$_2$) (isomer) | —(CH$_2$)$_3$—CH(CH$_3$)—CH$_2$— |
| 45 | —NH—CH$_2$CH$_2$—SO$_3$H | —(CH$_2$)$_3$—CH(CH$_3$)—CH$_2$— |
| 46 | —N(CH$_3$)—CH$_2$CH$_2$—SO$_3$H | —(CH$_2$)$_3$—CH(CH$_3$)—CH$_2$— |
| 47 | 1-amino-4-(3-aminopropylamino)anthraquinone-2-sulfonic acid | —(CH$_2$)$_3$—CH(CH$_3$)—CH$_2$— |

TABLE 1-continued
| Ex. | V$_1$ | B$_1$ |
|---|---|---|
| 48 | 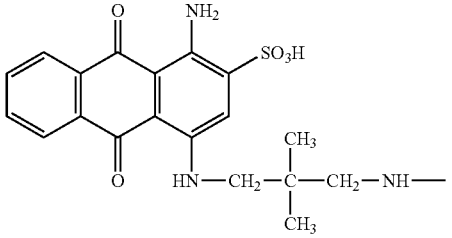 | —(CH$_2$)$_3$—CH(CH$_3$)—CH$_2$— |
| 49 | 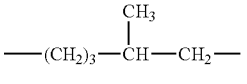 | 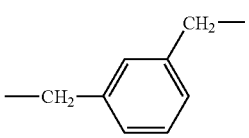 |
| 50 | 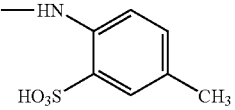 | 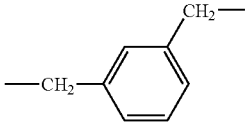 |
| 51 | 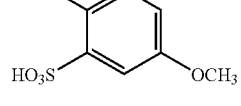 | 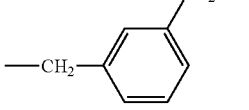 |
| 52 | 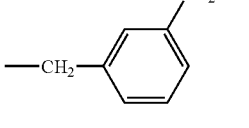 | 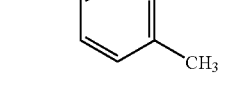 |
| 53 | 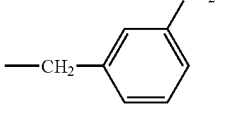 | 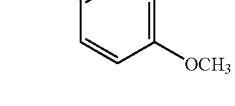 |
| 54 | 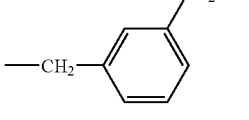 | 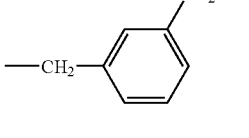 |
| 55 | 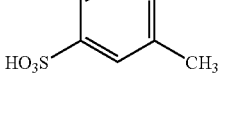 | 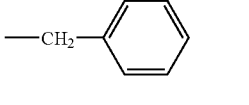 |
| 56 | 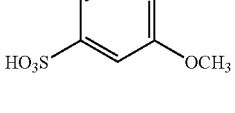 | 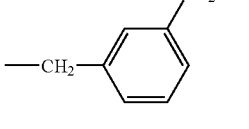 |
| 57 | | |

TABLE 1-continued

| Ex. | V₁ | B₁ |
|---|---|---|
| 58 | —NH—C₆H₃(SO₃H) (4-sulfo) | —CH₂—C₆H₄—CH₂— (meta) |
| 59 | —NH—C₆H₃(SO₃H)₂ (2,4-disulfo) | —CH₂—C₆H₄—CH₂— (meta) |
| 60 | —NH—(2-naphthyl, 1-SO₃H) | —CH₂—C₆H₄—CH₂— (meta) |
| 61 | —NH—(2-naphthyl, 1,5-diSO₃H) | —CH₂—C₆H₄—CH₂— (meta) |
| 62 | —NH—(2-naphthyl, 5,8-diSO₃H) substituted at 7 | —CH₂—C₆H₄—CH₂— (meta) |
| 63 | —NH—(naphthyl with 1,3-diSO₃H, attached at 7) | —CH₂—C₆H₄—CH₂— (meta) |
| 64 | —NH—(naphthyl with 1,3,6-triSO₃H, attached at 7) | —CH₂—C₆H₄—CH₂— (meta) |
| 65 | —NH—C₆H₃(SO₃H)(SO₂—CH₂CH₂—OSO₃H) | —CH₂—C₆H₄—CH₂— (meta) |
| 66 | —NH—C₆H₃(SO₃H)(SO₂—CH=CH₂) | —CH₂—C₆H₄—CH₂— (meta) |

TABLE 1-continued
| Ex. | V₁ | B₁ |
|---|---|---|
| 67 | 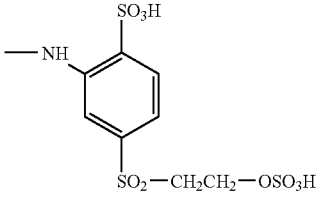 | 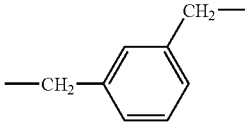 |
| 68 | 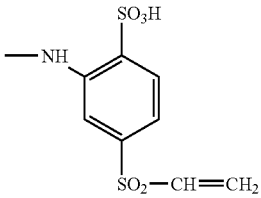 | 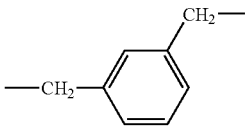 |
| 69 | —NH—CH₂CH₂—SO₃H | 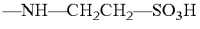 |
| 70 | 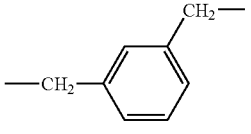 | 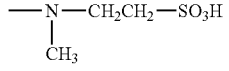 |
| 71 | 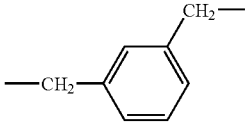 | 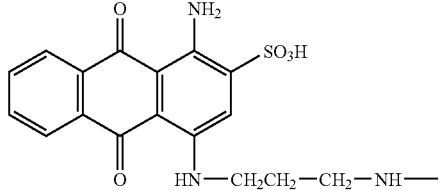 |
| 72 | 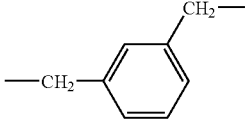 | 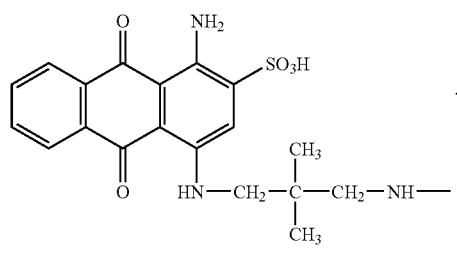 |
| 73 | 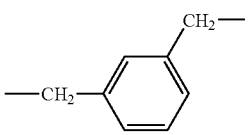 | 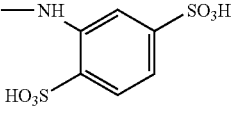 |
| 74 | 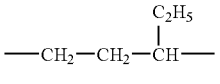 | 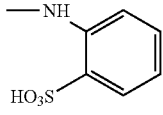 |
| 75 | 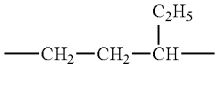 | 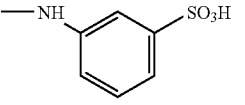 |

TABLE 1-continued

| Ex. | V₁ | B₁ |
|---|---|---|
| 76 | —NH—C₆H₄—SO₃H (para) | —CH₂—CH₂—CH(C₂H₅)— |
| 77 | —NH— 2-naphthyl-1-SO₃H | —CH₂—CH₂—CH(C₂H₅)— |
| 78 | —NH— 2-naphthyl-1,5-di-SO₃H | —CH₂—CH₂—CH(C₂H₅)— |
| 79 | —NH—CH₂CH₂—SO₃H | —CH₂—CH₂—CH(C₂H₅)— |
| 80 | —N(CH₃)—CH₂CH₂—SO₃H | —CH₂—CH₂—CH(C₂H₅)— |
| 81 | —NH—C₆H₄—SO₃H (para) | —CH₂—CH(OH)—CH₂— |

EXAMPLE 82

13 parts of cyanuric chloride are added dropwise to a solution of 17 parts of 2-aminobenzenesulfonic acid in 150 parts of water neutralised with sodium hydroxide and buffered with 5 parts of disodium hydrogenphosphate, while keeping the pH constant at 7 by the addition of sodium hydroxide solution. When the reaction is complete, a solution of 38 parts of an anthraquinone of formula

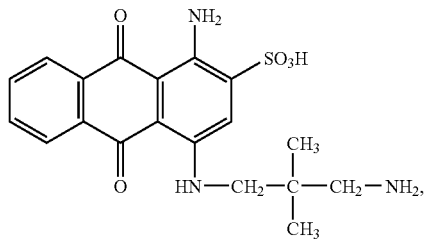

(101)

dissolved with 4 parts of lithium hydroxyde monohydrate in 380 parts of water, are added dropwise such that the pH does not exceed 10. The pH is then kept at 9.5 until completion of the reaction. The dye is salted out by addition of sodium chloride, isolated by filtration, washed with an aqueous solution of sodium chloride and dried, giving a dye of formula

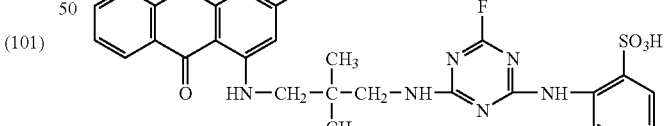

(105)

in the form of the free acid. The dye of formula (105) dyes cotton and wool in a blue shade.

The procedure of this Example is repeated, but replacing 17 parts of 2-aminobenzenesulfonic acid with an equimolar amount of an amine of formula H—V₁, and 38 parts of an anthraquinone of formula (101) with an equimolar amount of an anthraquinone of formula

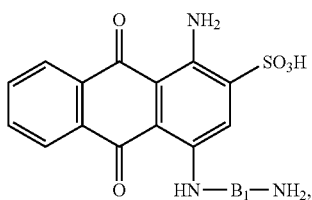
(103)

wherein $B_1$ and $V_1$ each have the meanings given in Examples 2-81, giving dyes of the general formula

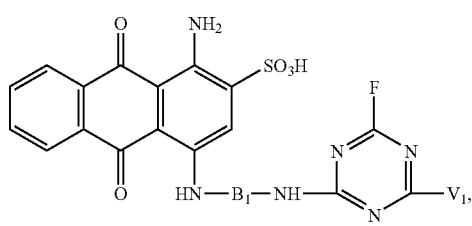
(106)

wherein $B_1$ and $V_1$ each have the meanings given in Examples 2-81, and which dye cotton and wool in blue shades.

In the Examples in which a product containing a β-sulfatoethylsulfonyl group is reacted with an anthraquinone, said reaction is carried out in more dilute medium at a pH of c.8.5.

Dyeing Instruction 2 parts of the reactive dye obtained in Example 1 are dissolved in 400 parts of water. To this solution are added 1500 parts of a solution which contains 53 g/l of sodium chloride. Then 100 parts of cotton fabric are put into this dyebath at 40° C., followed by the addition after 45 minutes of a solution containing 16 g/l of sodium hydroxide and 20 g/l of anhydrous $Na_2CO_3$. The temperature of the dyebath is kept at 40° C. for a further 45 minutes. The dyed goods are then rinsed, soaped at the boil for ¼ hour with a nonionic detergent, rinsed once more and dried.

Printing Instruction

With rapid stirring, 3 parts of the dye obtained in Example 1 are strewed into 100 parts of a stock thickening which contains 50 parts of 5% sodium alginate thickener, 27.8 parts of water, 20 parts of urea, 1 part of sodium m-nitrobenzenesulfonate and 1.2 parts of sodium hydrogencarbonate. A cotton fabric is printed with the resultant printing paste and dried. The printed fabric is then steamed for 2 minutes at 102° C. in saturated steam. The printed fabric is then rinsed, if necessary soaped at the boil, rinsed once more and dried.

What is claimed is:

1. A method of dyeing or printing a hydroxyl-group-containing or nitrogen-containing fibre material which comprises the step of applying to said fibre material a tinctorially effective amount of an anthraquinone dye according to formula

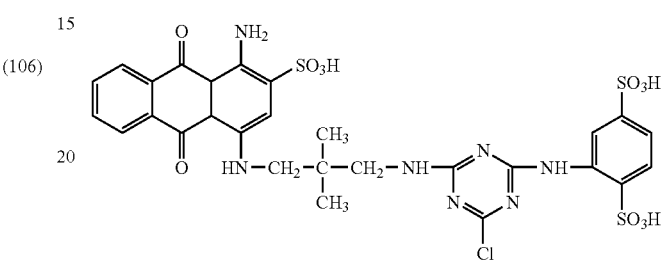

or

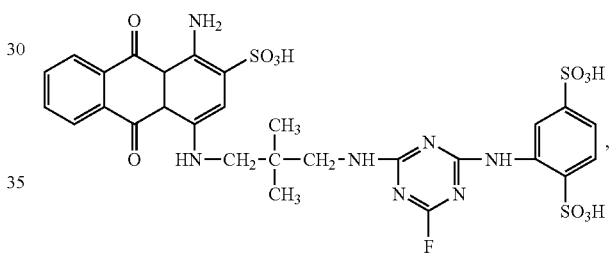

wherein the dyeings have high fixation yields and high fibre-dye bonding stability.

2. A method according to claim 1 wherein the fibre material is a cellulosic fibre material or a natural or synthetic polyamide fibre material.

* * * * *